United States Patent
Korycan et al.

(10) Patent No.: US 6,473,302 B1
(45) Date of Patent: Oct. 29, 2002

(54) COMMUNICATIONS DEVICE HOLDER FOR VEHICLES

(75) Inventors: George M. Korycan, Union, IL (US); William F. Zancho, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 96 days.

(21) Appl. No.: 09/626,522

(22) Filed: Jul. 27, 2000

(51) Int. Cl.[7] .............................. G06F 1/16; A47B 83/00
(52) U.S. Cl. ...................... 361/686; 361/683; 307/8.1; 710/303; 312/827; 312/223.1; 206/576; 206/305
(58) Field of Search ................................. 361/683, 686, 361/724–727, 679; 710/303, 304; 307/8.1, 10.1; 206/576, 320, 305; 312/827, 223.1, 223.2, 223.3

(56) References Cited

U.S. PATENT DOCUMENTS

| | | | | |
|---|---|---|---|---|
| 4,946,120 A | * | 8/1990 | Hatcher ...................... 248/183 |
| 5,542,589 A | * | 8/1996 | McKee ........................ 224/275 |
| 5,551,616 A | * | 9/1996 | Stitt et al. .................... 224/275 |
| 5,560,676 A | * | 10/1996 | Griffith et al. ............... 224/275 |
| 5,628,439 A | * | 5/1997 | O'Hara ........................ 224/275 |
| 5,687,893 A | * | 11/1997 | Jacobsmeyer, Jr. .......... 224/275 |
| 5,951,128 A | * | 9/1999 | Aidone et al. ............. 312/223.3 |
| 5,966,285 A | * | 10/1999 | Sellers ........................ 361/686 |
| 5,973,917 A | * | 10/1999 | White ......................... 361/683 |
| 6,015,198 A | * | 1/2000 | Stair ....................... 312/235.1 |

* cited by examiner

Primary Examiner—Darren Schuberg
Assistant Examiner—Lisa Lea-Edmonds
(74) Attorney, Agent, or Firm—Roland K. Bowler II

(57) ABSTRACT

To facilitate hands-free operation, a communications device holder (110, 300, 400) includes a tongue (202) that is adapted to mate with and be latched within a seat belt buckle (112) of an unoccupied vehicle passenger position. The communications device holder includes a docking assembly (200) that is adapted to receive and securely hold a communications device (120). The docking assembly includes interfaces for power, speakers, microphones and the like. A flexible member (302) is alternatively attached to the tongue to flexibly configure the position of the device holder. A seat belt buckle (402) is optionally attached to the communications device holder for securing the device holder both with the seat belt buckle for a passenger position and with the seat belt.

20 Claims, 2 Drawing Sheets

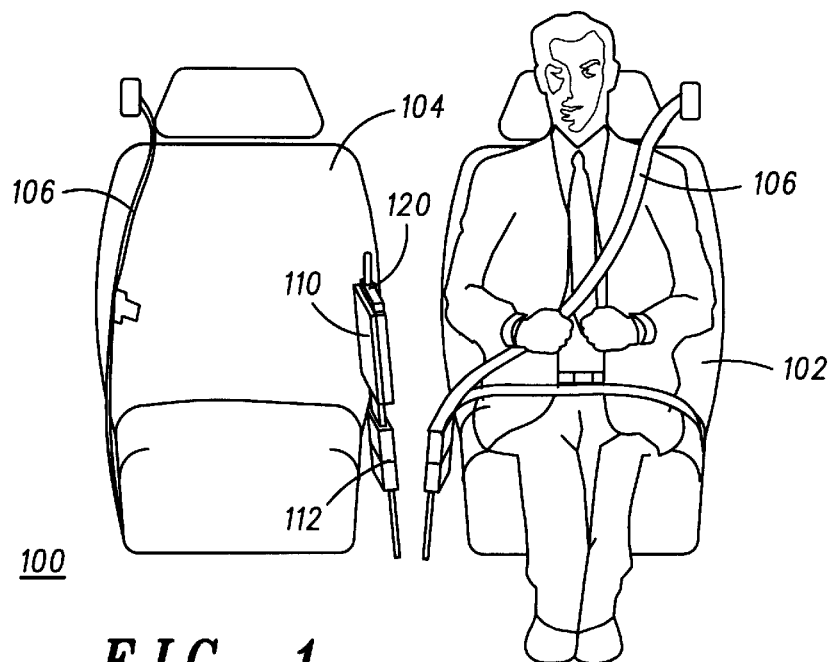
FIG. 1
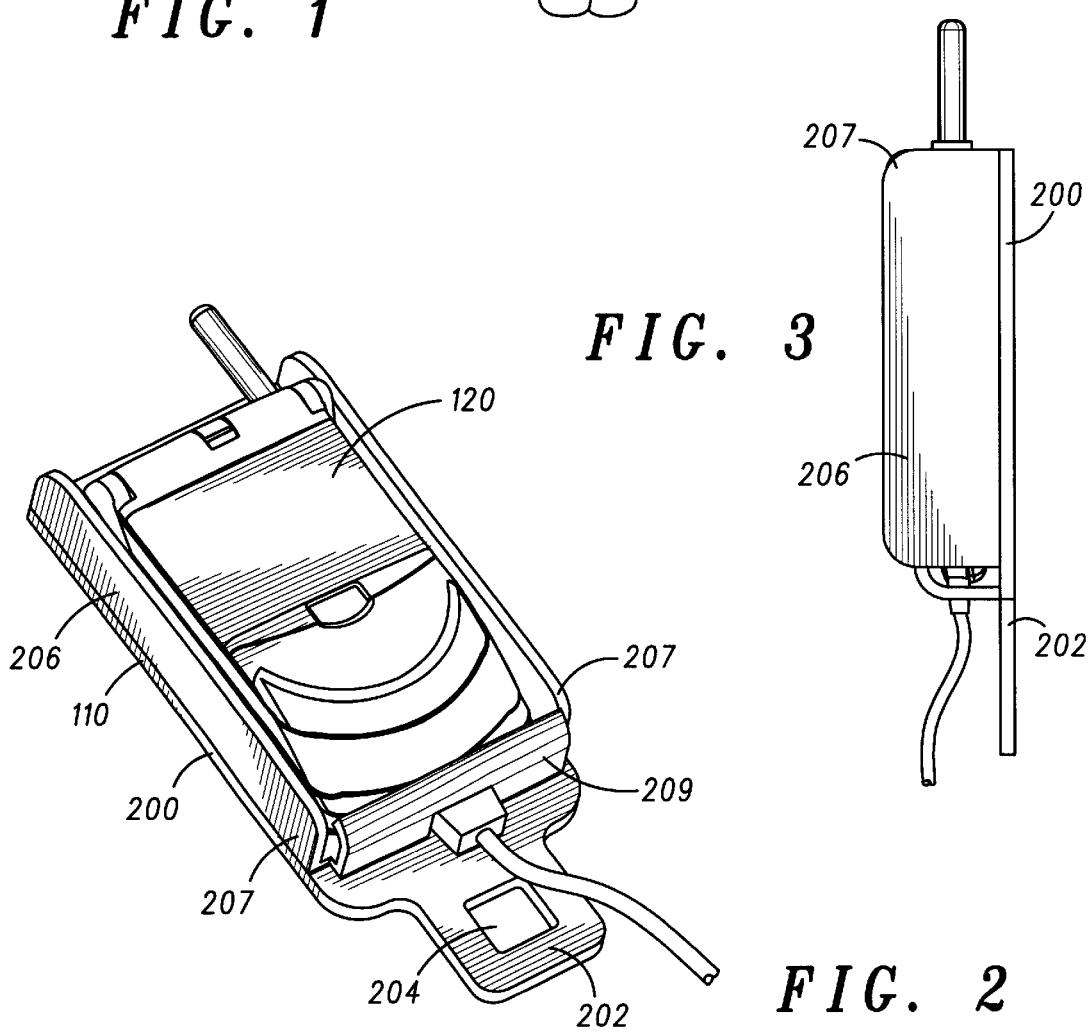
FIG. 3
FIG. 2

COMMUNICATIONS DEVICE HOLDER FOR VEHICLES

FIELD OF THE INVENTION

The present invention relates generally to holders and docking stations for portable communications devices, such as wireless telephones, and in particular to a communications device holder that mounts in a vehicle's seat belt buckle.

BACKGROUND OF THE INVENTION

Presently, wireless communication devices are widely used. In particular, wireless telephones, personal digital assistants, pagers and other communications devices are widely used in business and for pleasure. As wireless communication devices proliferate, safety issues arise. In particular, the use of wireless communication devices while driving a vehicle raises safety issues. Many jurisdictions now mandate hands-free telephone use while driving. Many other jurisdictions are considering similar rules.

Docking stations or vehicular telephone holders are known ways to facilitate hands free use of a wireless telephone. Some docking stations are fixed and permanently mounted in the vehicle. The permanent docking station typically includes interfaces for powering the communications device, connecting to an antenna, speaker use and microphone use. Permanently mounting a docking station for a communications device in a vehicle typically requires physical alteration to the vehicle for drilling holes, mounting and the like. Physical alteration of the vehicle is often not desired.

Removable docking stations are also known. In one particular arrangement, a docking base that is adapted to hold a communications device is mounted to a generally cylindrical elongated base that plugs into a standard automobile cigarette lighter. The cigarette lighter provides power. The docking station includes an adapter to the communications device for power and a speaker to facilitate hands-free use. The elongated base does not latch into the cigarette lighter. While suitable for some arrangements, portable docking stations that are not latched in place have the potential to become airborne during collisions, which may cause physical injury and property damage.

In light of the shortcomings of existing communications device holders for vehicles, a need exists for an improved apparatus for flexibly providing hands-free operation.

BRIEF DESCRIPTION OF THE DRAWINGS

FIG. 1 is a perspective view of the interior of a vehicle with a communications device holder in accordance with the present invention.

FIG. 2 is a perspective view of a preferred embodiment of a communications device holder in accordance with the present invention.

FIG. 3 is a side view of the communications device holder shown in FIG. 2.

DETAILED DESCRIPTION OF THE PREFERRED EMBODIMENTS

Figure 4:
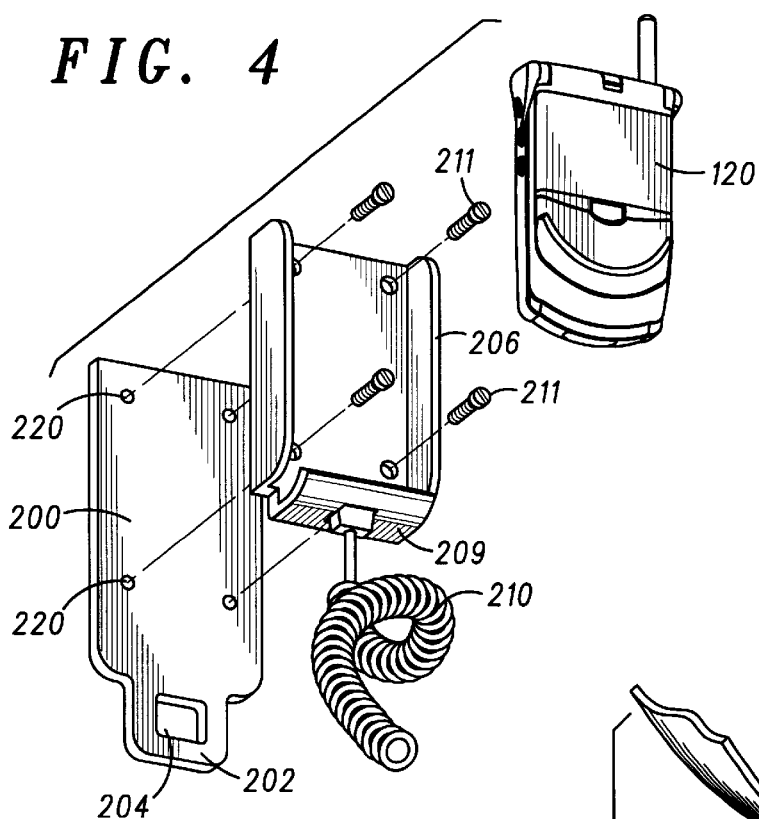
FIG. 4 is an exploded view of the communications device and communications device holder shown in FIG. 1.

In summary, a communications device holder in accordance with the present invention includes a docking assembly that is adapted to hold a communications device, such as a wireless telephone. The communications device holder is adapted for use in an unoccupied passenger position of the vehicle. The docking assembly includes a tongue that is adapted to be received by a seat belt buckle and latched therein. Preferably, the docking assembly includes a rigid platform that is integral with the tongue and sized to mate with a docking base. The docking base is adapted to secure the communications device in place. The docking base preferably provides an adapter for interfaces for power, antenna connections and the like.

The platform portion of the docking assembly alternatively includes a flexible member that facilitates flexible configuration of the device holder while the device is secured in a seat belt buckle. Also, a seat belt buckle is alternatively attached to a top portion of the platform of the docking assembly. In operation, the seat belt buckle on the top portion of the platform is mated with the tongue attached to the seat belt of the vehicle. And, the tongue on the docking assembly is inserted in the vehicle seat belt buckle. This arrangement further secures the device holder in place.

FIG. 1 is a perspective view showing an automobile interior 100. The vehicle interior 100 includes a driver's seat 102 and a passenger seat 104. Seat belts 106, which are standard in automobiles, are shown in FIG. 1 with the driver's seat belt 106 engaged. No passenger is in seat 104, leaving the seat belt buckle for that unoccupied position available for mounting a communications device holder in accordance with the present invention. Accordingly, a communications device holder 110 with a wireless telephone 120 is shown inserted into seat belt buckle 112.

FIGS. 2 through 4 show communications device holder 110 in additional detail. Communications device holder 110 includes a platform portion 200. Platform portion 200 includes a tongue 202 that is configured and adapted to mate with a seat belt buckle. Tongue 202 includes an opening 204, which is traditionally used in latching tongue 202 into a seat belt buckle. A docking base 206 is preferably attached to platform portion 200. Docking base 206 secures a communications device for hands-free operation. An adapter may be included with docking base 206 for the connection of a cable 210 to provide power and other necessary wiring. The adapter, if provided, is configured to mate with an accessory port on wireless telephone 120. Alternatively, docking base 206 includes an opening for receiving a cable 210, which is configured to mate directly with an accessory port on wireless telephone 120.

Platform portion 200 is preferably a rigid material, such as metal or plastic. Platform portion 200 has a generally rectangular configuration. Tongue 202 is most preferably integral with platform portion 200. Alternatively, tongue 202 is bolted or welded to platform portion 200. The materials and configurations selected for platform portion 200 are determined in part by safety standards relating to the force the communications device holder must withstand. Platform portion 200 preferably includes mounting holes 220 for use in affixing platform portion 200 to docking base 206. Screws or bolts 211 are engaged with holes 220 for affixing platform portion 200 to docking base 206.

Docking base 206 is preferably plastic. Docking base 206 secures a communications device within. To that end, docking base 206 is sized and configured in accordance with the communications device it must accommodate. Docking base 206 includes side walls 207 and a bottom wall 209. Docking base 206 frictionally engages, latches or otherwise secures a communications device within. Cable 210 and the associated opening for cable 210 are sized and configured in accordance with the communications device that must be accommodated. Similarly, if an adapter is provided for mating with the communications device and cable 210, the adapter is sized and configured accordingly. Cable 210 and/or the adapter provide interfaces for power, antenna connections, speaker connections, microphone connections, headset connections, and any other suitable connections for the communications device.

Figure 5:
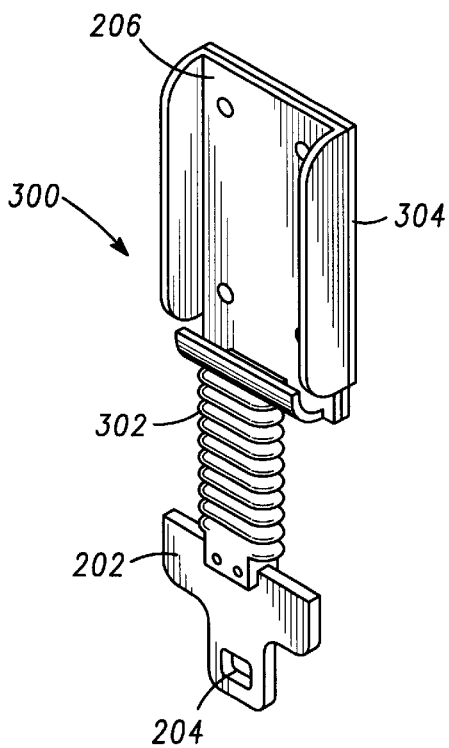
FIG. 5 is an alternate embodiment of a communications device holder in accordance with the present invention.

FIG. 5 shows an alternative embodiment of a communications device holder 300 in accordance with the present invention. Communications device holder 300 is similar to communications device holder 110, except that a flexible member 302 connects a rigid platform member 304 with tongue 202. Flexible member 302 permits holder 300 to be flexibly manipulated to accommodate different speaking positions.

Flexible member 302 is bolted, welded, or integral with tongue 202. Preferably, flexible member 302 is metal or plastic that is readily bent, deformed or manipulated by a user, but holds its shape when not being manipulated by a user. Flexible member 302 is bolted, welded, or integral with rigid platform member 304, which is attached to docking base 206.

Figure 6:
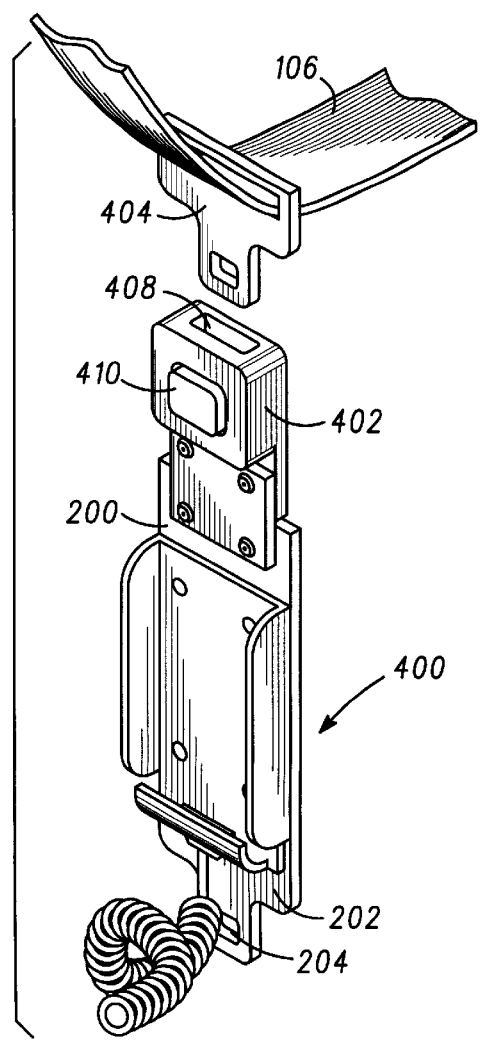
FIG. 6 is a perspective view of yet another embodiment of a communication device holder in accordance with the present invention.

FIG. 6 shows another preferred embodiment of the present invention. Communications device holder 400 of FIG. 6 is similar in most respects to communications device holder 110, as noted by the reuse of reference numerals for similar parts. However, for further securing the communications device holder in place, a seat belt buckle 402 is attached to platform portion 200 at a top portion, opposite the tongue 202. Seat belt buckle 402 is bolted, welded or integral with platform portion 200. Seat belt buckle 402 includes an opening 408 for receiving a tongue and a release button 410 for releasing the latching mechanism that latches a tongue within seat belt buckle 402. When in use, seat belt buckle 402 is mated with the tongue 404 of a seat belt 106 in the automobile. Tongue 202 on device holder 400 is inserted into the seat belt buckle for the unoccupied vehicle position.

Hands-free operation of a communications device holder in accordance with the present invention requires securing the device in the holder and securing the holder in the seat belt buckle of an unoccupied position of the vehicle. For example, referring to communications device holder 400, a communications device is secured in the docking base 206. This entails latching or frictionally engaging the device in the docking base 206. Also, cable 210 is mated with an accessory port on the communications device or mated with an adapter on docking base 206 that is engaged with the accessory port on the communications device. Then tongue 202 is inserted into the seat belt buckle for the unoccupied passenger position and latched therein. Optionally, for orientation and additional security, tongue 404 of seat belt 106 is inserted and latched into belt buckle 402, which is attached to device holder 400. A speaker and microphone integrated into docking base 206 facilitate hands-free operation. Alternatively, a headset with speaker and microphone are connected to the communications device to facilitate hands free operation.

By virtue of the present invention, a communications device holder facilitates hands-free operation of a communications device. The communications device holder is latched in a seat belt buckle for safely securing the device. Permanent alteration of the vehicle is avoided.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A communications device holder comprising:

a docking assembly, a communications device holder coupled to the docking assembly, a seat belt buckle tongue rigidly coupled to the docking assembly, whereby the seat belt buckle tongue is matably engageable with a set belt buckle.

2. The communications device holder of claim 1, wherein the docking assembly further comprises:

a platform portion connected to the seat belt buckle tongue; and a communications device docking base mounted to the platform portion.

3. The communications device holder of claim 2 wherein the platform portion is integral with the seat belt buckle tongue.

4. The communications device holder of claim 2 wherein the platform portion is bolted to the seat belt buckle tongue.

5. The communications device holder of claim 2 wherein the platform portion is welded to the seat belt buckle tongue.

6. The communications device holder of claim 2 wherein the platform portion comprises a rigid material.

7. The communications device holder of claim 6 wherein the platform portion comprises one of metal and plastic.

8. The communications device holder of claim 2 wherein the platform portion includes a flexible member connected to the seat belt buckle tongue and a rigid member mounted to the communications device docking base.

9. The communications device holder of claim 2 wherein the communications device docking base is adapted to frictionally engage the communications device.

10. The communications device holder of claim 2 wherein the communications device docking base is adapted to latch the communications device.

11. The communications device holder of claim 2 wherein the communications device docking base includes at least one of a power interface, an antenna connection, a speaker interface, and a microphone interface.

12. The communications device holder of claim 1 further comprising a seat belt buckle connected to the docking assembly, the seat belt buckle being adapted to receive a seat belt tongue.

13. A communications device holder comprising:

a platform, a seat belt buckle tongue coupled to the platform, the seat belt buckle tongue having a buckle latch opening sized and configured to accept a seat belt buckle latch; and a communications device docking station coupled to the platform, whereby the communications device docking station is removably connectable to a communications device.

14. The communications device holder of claim 13 wherein the platform comprises a rigid material.

15. The communications device holder of claim 14 wherein the platform comprises one of metal and plastic.

16. The communications device holder of claim 13 wherein the communications device docking station includes at least one of a power interface, an antenna connection, a speaker interface, and a microphone interface.

17. The communications device holder of claim 13 further comprising a seat belt buckle connected to the platform, the seat belt buckle being adapted to receive a seat belt tongue.

18. A portable communication device holder comprising:
   a communication device holder; and
   a seat belt buckle tongue extending from a first end of said communication device holder, said seat belt buckle tongue removably couplable to a seat belt buckle tongue receiver.

19. The device holder of claim 18, comprising a seat belt buckle tongue receiver extending from an opposite end of said communication device holder, removably couplable to a seat belt buckle tongue.

20. The device holder of claim 18 wherein said first end of said communication device holder is located relative to, and said tongue is extending away from, a bottom of said portable communication device.

* * * * *